Patented June 4, 1935

2,003,842

UNITED STATES PATENT OFFICE 2,003,842

PROCESS FOR THE MANUFACTURE OF 2'-NITRO-2-CARBOXY-DIPHENYLAMINE

Louis Spiegler, South Milwaukee, Wis., assignor to E. I. du Pont de Nemours & Company, Wilmington, Del., a corporation of Delaware No Drawing. Application November 23, 1933, Serial No. 699,406

6 Claims. (Cl. 260—109)

This invention relates to a new and improved process for the manufacture of 2'-nitro-2-carboxy-diphenylamine.

Various methods for preparing this compound have been described in the literature. In Annalen der Chemie, vol. 355, page 327, Ullmann describes three different methods, namely: (a) By melting the potassium salt of o-chlorobenzoic acid with a large excess of o-nitro-aniline in the presence of copper acetate. This process gives a yield of about 42% of theory, according to the author. (b) By reacting the potassium salt of o-chlorobenzoic acid with o-nitro-aniline and potassium carbonate in the presence of copper powder as a catalyst, using amyl alcohol as a vehicle. Again, yields of only about 50% of theory were obtained. (c) By reacting anthranilic acid with o-bromo-nitrobenzene in amyl alcohol with potassium carbonate and a trace of copper powder. The yields here are alleged to be about 95% of theory. This latter process, however, is commercially impractical due to the fact that o-bromo-nitrobenzene is not a cheap commercial compound and its cost prohibits its use in such a process.

In J. Chem. Soc. (London), vol. 125, page 1770, Clemo, Perkin and Robinson describe a process for preparing 2'-nitro-2-carboxy-diphenylamine in which anthranilic acid is reacted with o-nitrochlorobenzene and potassium carbonate in the presence of copper, using an excess of approximately 27% of o-nitro-chlorobenzene. A yield of 2'-nitro-2-carboxy-diphenylamine of approximately 89% of theory based on anthranilic acid was obtained having a melting point of 195 to 205° C. (Melting point of pure 2'-nitro-2-carboxy-diphenylamine=219° C.)

It has been found by experience that this latter process is impractical for large scale production for the following reasons: (1) According to this method there is charged into the vessel at one time the entire mixture of o-nitro-chloro-benzene, potassium carbonate, anthranilic acid and copper. Such mixture, upon being heated, forms a large amount of carbon dioxide gas (at temperatures between 70 and 100° C.) and invariably results in a boilover. (2) The condensation mass solidifies at at least two different stages before the reaction is completed. This materially hinders proper agitation and is conducive to local overheating. (3) The 2'-nitro-2-carboxy-diphenylamine tends to decarboxylate at temperatures above 230° C., which temperatures are often attained in the solid mass due to local overheating.

The reaction of o-nitro-chlorobenzene with anthranilic acid and potassium carbonate may be considered as occurring in two stages, namely: (I) the neutralization of anthranilic acid by the potassium carbonate to form potassium anthranilate, potassium bicarbonate, carbon dioxide and water, and (II) the condensation of the potassium salt of anthranilic acid with o-nitrochlorobenzene by copper catalyst and potassium bicarbonate to yield 2'-nitro-2-carboxy-diphenylamine, water, and carbon dioxide gas. These reactions are illustrated by the following formulas

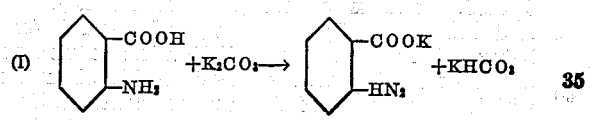

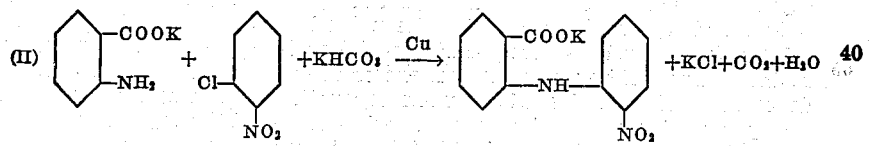

Obviously the removal of carbon dioxide and water from the reaction mixture will help drive the reaction to completion. Clemo et al. aided their condensation by permitting water and o-nitro-chlorobenzene to distill out until the reacting mixture became solid at 200–220° C. At this point a third reaction is possible due to local overheating (III) namely,

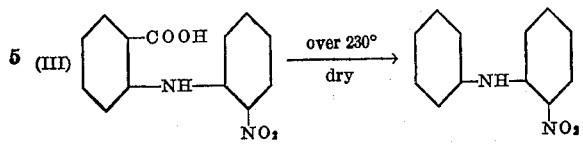

heated above 160° C., in the presence of a copper catalyst.

or decarboxylation of the 2'-nitro-2-carboxy-diphenylamine with pyrogenic evolution of heat. This latter reaction especially manifests itself when the process is carried out on a large scale and is so violent that when once started it may assume the proportions of an explosion.

It has now been found that 2'-nitro-2-carboxy-diphenylamine may be prepared in high yields and without the attendant disadvantages of the process of Clemo et al. when the alkali metal anthranilate (formed in any manner desired) is reacted with o-nitro-chlorobenzene in the presence of an alkali-metal bicarbonate or other acid binding agent of similar alkalinity, and when sufficient o-nitro-chlorobenzene is used to maintain the mass in a fluid condition throughout the reaction. The alkali metal anthranilate may be formed as hereinafter described in o-nitro-chlorobenzene by the use of sodium or potassium carbonate or it may be formed in aqueous solution at ordinary temperatures using alkali metal hydroxides or carbonates and after being isolated in substantially dry form it may be used in the second step of the process.

To more fully describe my invention the following example is given, in which parts by weight are used.

*Example*

145 parts of 100% anthranilic acid are milled intimately with 146.7 parts of 100% potassium carbonate, and 0.3 part of copper powder. This mixture is charged over a period of 2 to 3 hours into 435–870 parts of o-nitro-chlorobenzene which has been heated to 150–160° C. The temperature of the reaction mixture is raised 10° C. per hour to 185–195° C. and is maintained at this temperature for 2 hours. The red colored mass is finally heated to 200–205° C. until a sample shows the anthranilic acid to be completely consumed (by titration with N/10 sodium nitrite). During the course of the reaction, water, and small amounts of o-nitro-chlorobenzene are distilled out and collected. When completely condensed, the mass is allowed to cool slightly, and is diluted with 1800–2000 parts of water before being subjected to steam distillation to remove the excess of unreacted o-nitro-chlorobenzene which can be re-used for another condensation. Filtration from 20–25 parts of crude 2,2'-dinitro-diphenyl, which is formed as a by-product gives a dark red liquor which contains the potassium salt of the desired 2'-nitro-2-carboxy-diphenylamine. This solution, run into an excess of hydrochloric acid and ice, yields upon separation 260 parts of dry 2'-nitro-2-carboxy-diphenylamine, having a melting point of 206–213° C., and is equal to 95% of theory.

This reaction may also be carried out by mixing molecular quantities of an alkali metal anthranilate, and an alkali metal bicarbonate to sufficient amount of o-nitro-chlorobenzene to maintain the mass in a fluid condition when heated above 160° C., in the presence of a copper catalyst.

It is to be understood of course that the above examples are given to illustrate the present invention and are in no manner to be considered as a limitation thereupon. The quantity of o-nitro-chlorobenzene used should be sufficient to assure the fluidity of the reaction mass at all temperatures during the reaction period.

The anthranilic acid, potassium carbonate, copper mixture can be charged into the o-nitro-chlorobenzene at temperatures from 110° up to 205° C. Temperatures of 155–160° C. are preferred since the potassium anthranilate is fused in the o-nitro-chlorobenzene at temperatures over 150° C., thereby permitting neutralization of the anthranilic acid without solidification. Temperatures of 155–160° C. are preferred to the higher limits since they minimize as much as possible the quantity of o-nitro-chlorobenzene fumes emitted during the charging.

The importance of the intimate mixing of the anthranilic acid, and the carbonate cannot be over-estimated. Nor can the relationship in the amount of potassium carbonate per part of anthranilic acid in the mixture be varied to any great extent without detrimental results. An excess of potassium carbonate leads to the formation of 2,2'-dinitro-diphenyl and also causes decomposition of the potassium anthranilate, while an insufficient amount leaves in the reaction mass unchanged anthranilic acid.

Using a large excess of o-nitro-chlorobenzene, the condensation mass can be heated up to the boiling point of the o-nitro-chlorobenzene (236–240° C.) without danger of decarboxylation, or excessive degradation of 2'-nitro-2-carboxy-diphenylamine.

While the use of other diluents or solvents with an excess of o-nitro-chlorobenzene has been found to give satisfactory yields under the conditions above described in some cases their use renders the process more complex and does not offer any material improvement over the use of o-nitro-chlorobenzene alone. In any case, for complete conversion, a large excess of o-nitro-chlorobenzene is necessary.

The reaction can be performed with quantities of o-nitro-chlorobenzene and anthranilic acid as described in the prior art up to the point of solidification; when for purposes of even heating and completion of reaction without danger of decarboxylation, the reaction mass may be diluted with suitable solvent such as nitrobenzol, dichlorobenzol or more o-nitro-chlorobenzol. In short the excess of o-nitro-chlorobenzene necessary to keep the mass in a fluid condition may be added either at the beginning or toward the end of the reaction time.

In this process, where the mass is kept in a fluid condition, it is possible to replace potassium carbonate by the less expensive soda ash. Ordinarily, without the large excess of o-nitro-chlorobenzene, the use of soda ash is impractical because of the poor fusibility of the soda salt of the nitro-diphenylamine-carboxy acid and the sodium chloride which are formed.

Further, it is possible to effect the condensation by means of potassium or sodium bicarbonate on dry potassium or sodium anthranilate suspended in o-nitro-chlorobenzene, or its mixtures. Alkalies materially stronger than bicarbonate have a very detrimental effect on the yield, and result in the decomposition of o-nitro-chlorobenzene to give undesirable by-products.

Copper salts such as cuprous chloride, basic acetate of copper, or cuprous oxide can be employed in place of copper powder.

The excess o-nitro-chlorobenzene may be removed from the completed reaction mass after dilution by extraction with solvent, such as benzene, toluene, etc., instead of by steam distillation as described in the example given above.

This invention provides a safe practical method for the preparation of 2'-nitro-2-carboxy-diphenylamine and eliminates all of the hazards due to the previously unforeseen decarboxylation of 2'-nitro-2-carboxy-diphenylamine potassium salt.

I claim:

1. In the preparation of 2'-nitro-2-carboxy-diphenylamine wherein anthranilic acid is reacted with an alkali-metal carbonate in the presence of o-nitro-chlorobenzene and heated in the presence of a catalyst at temperatures of from 185–205° C., the step which comprises using a sufficient excess of o-nitro-chlorobenzene in the mass during the final stage of the reaction to maintain the mass in a fluid condition.

2. In the process for the manufacture of 2'-nitro-2-carboxy-diphenylamine, the step which comprises carrying out the reaction between an alkali-metal anthranilate and o-nitro-chlorobenzene in the presence of a sufficient excess of the latter to maintain the mass in a fluid condition when the temperature of the reaction is raised above 160° C.

3. In the process for the manufacture of 2'-nitro-2-carboxy-diphenylamine, the step which comprises reacting an alkali-metal anthranilate and o-nitro-chlorobenzene in the presence of an alkali-metal bicarbonate, the amount of o-nitro-chlorobenzene used being sufficient to maintain the mass in a fluid state during the final stages of the reaction.

4. In the process for the manufacture of 2'-nitro-2-carboxy-diphenylamine, the step which comprises reacting an alkali-metal anthranilate and o-nitro-chlorobenzene in the presence of an alkali-metal bicarbonate, the amount of o-nitro-chlorobenzene used being sufficient to maintain the mass in a fluid state when heated above 160° C.

5. In the preparation of 2'-nitro-2-carboxy-diphenylamine, the step which comprises gradually adding an intimate mixture of anthranilic acid and potassium carbonate in molecular proportions of 1:1 to o-nitro-chloro-benzene at temperatures of 110° to 205° C.

6. In the preparation of 2'-nitro-2-carboxy-diphenylamine the step which comprises reacting molecular quantities of an alkali-metal anthranilate and an alkali not materially stronger than an alkali metal bicarbonate with o-nitro-chlorobenzene, in a sufficient excess of the latter compound to maintain the mass in a fluid condition when the temperature of the mass is raised above 160° C.

LOUIS SPIEGLER.